US008205756B2

(12) United States Patent
Backman

(10) Patent No.: US 8,205,756 B2
(45) Date of Patent: Jun. 26, 2012

(54) HYDROCYCLONE

(75) Inventor: Jan Backman, Jänfälla (SE)

(73) Assignee: Ovivo Luxembourg S.å.r.l, Luxembourg (LU)

( * ) Notice: Subject to any disclaimer, the term of this patent is extended or adjusted under 35 U.S.C. 154(b) by 190 days.

(21) Appl. No.: 12/864,692

(22) PCT Filed: Jan. 29, 2009

(86) PCT No.: PCT/SE2009/050091

§ 371 (c)(1),
(2), (4) Date: Jul. 27, 2010

(87) PCT Pub. No.: WO2009/096890

PCT Pub. Date: Aug. 6, 2009

(65) Prior Publication Data

US 2010/0307969 A1 Dec. 9, 2010

(30) Foreign Application Priority Data

Jan. 31, 2008 (SE) ...................................... 0800237

(51) Int. Cl.
*B01D 17/038* (2006.01)
*B04C 5/081* (2006.01)

(52) U.S. Cl. ..................... 210/512.1; 210/788; 209/727; 209/733

(58) Field of Classification Search ............... 210/512.1, 210/788; 209/727, 733
See application file for complete search history.

(56) References Cited

U.S. PATENT DOCUMENTS 4,510,056 A * 4/1985 Frykhult et al. ........... 210/512.1
5,437,794 A * 8/1995 Andersson ................. 210/512.1
5,653,347 A * 8/1997 Larsson ..................... 210/512.1

FOREIGN PATENT DOCUMENTS

SE 429050 B * 8/1983
WO WO 2009096890 A1 * 8/2009

OTHER PUBLICATIONS

The Written Opinion for PCT/EP2009/050091, Apr. 2009.*

* cited by examiner

*Primary Examiner* — David A Reifsnyder

(57) ABSTRACT

A hydrocyclone (1) for separating a liquid mixture into a heavy fraction and a light fraction, comprising a housing (2) forming an elongated separation chamber (3) having a circumferential wall (4), a base end (5), an apex end (6), means (10) for supplying the liquid mixture to the separation chamber (3) via the at least one inlet member (7), so that during operation a liquid stream is generated as a helical vortex (11) about a centre axis (12), at least one path (13) in the circumferential wall (4) at least over a portion of the separation chamber (3), and at least one means for creating turbulence, which comprises at least one step (14) in the path (13) of the circumferential wall (4) showing an increase of the radius of the separation chamber (3), wherein the at least one step (14) having an angle (α) relative the centre axis (12).

10 Claims, 3 Drawing Sheets

HYDROCYCLONE

TECHNICAL FIELD

Figure 2:
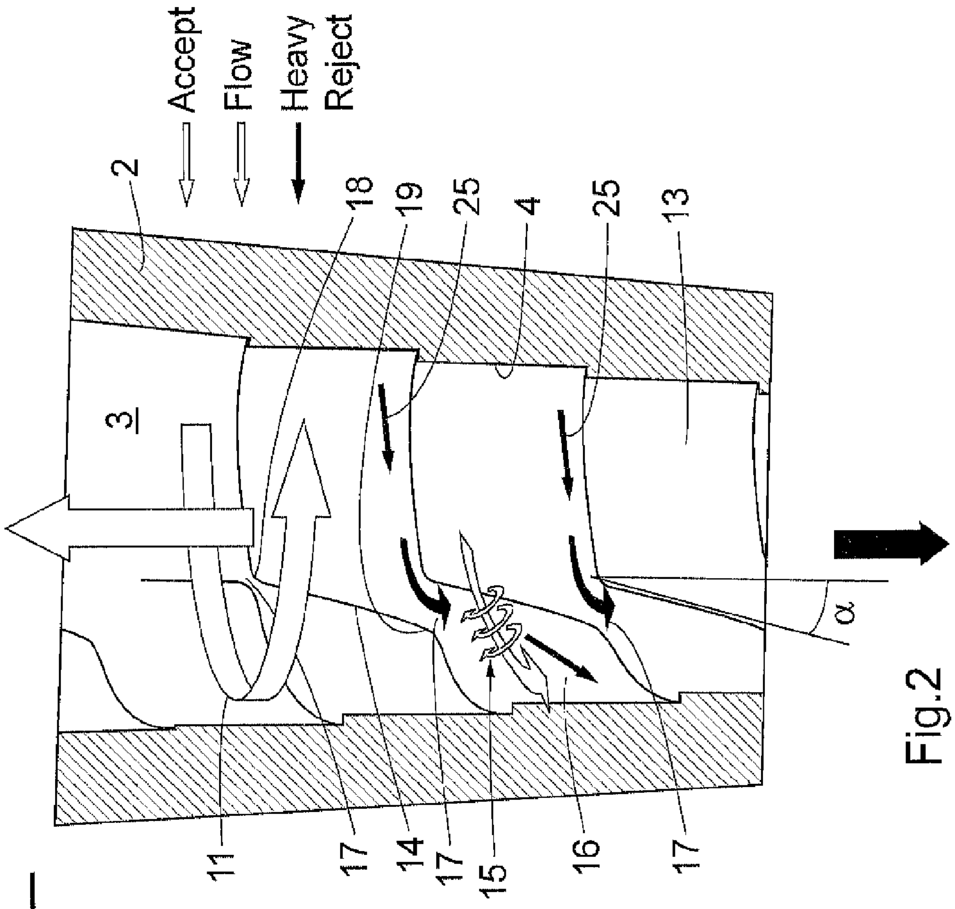

The present invention concerns a hydrocyclone with means for creating turbulence. In more detail, a hydrocyclone for separating a liquid mixture into a heavy fraction and a light fraction, comprising a housing forming an elongated separation chamber having a circumferential wall, a base end and an apex end. The housing having at least one inlet member for supplying a liquid mixture into the separation chamber where at least one of the inlet member/-s is positioned at the base end, a first outlet member for discharging separated light fraction from the separation chamber at the base end, and a second outlet member for discharging separated heavy fraction from the separation chamber at the apex end.

It is also provided means for supplying the liquid mixture to the separation chamber via the at least one inlet member, so that during operation a liquid stream is generated as a helical vortex about a centre axis in the separation chamber, said helical vortex extending from the base end to the apex end. At least one path is provided in the circumferential wall at least over a portion of the separation chamber, and at least one means for creating turbulence is provided, which comprises at least one step in the path of the circumferential wall showing an increase of the radius of the separation chamber.

BACKGROUND ART

In the pulp and paper industry hydrocyclones are widely used for cleaning fibre suspensions from undesired particles and pollution, most commonly heavy particles. Thus the fibre suspension is separated into a heavy fraction containing said undesired heavy particles and a light fraction containing fibres.

In the definition of undesired heavy particles, this comprises particles having higher density compared with the accepted fibres, such as sand, grit, metal, coating flakes and high density plastics. But the undesired particles could also be organic particles originating from wood sources, for example various bark particles, shives, chops, resin particles, vessels and thick wall coarse fibres. The latter ones could have equal density as accepted fibres but is separated due to its lower specific surface.

A typical hydrocyclone plant for this purpose has hydrocyclones arranged in cascade feedback stages.

In order to keep the number of feedback stages down it is important to separate with as high selectivity as possible within each hydrocyclone, i.e. minimize the fibre portion separated and discharged through a heavy fraction outlet of each hydrocyclone, without reducing the share of undesired particles. It is also important to reduce the fibre concentration in the heavy fraction outlet in order to avoid clogging of the heavy fraction outlet at the apex and obtain secure operation conditions.

An aim is to minimize the Thickening factor Tf.

$$Tf=Rm/Rv$$

where Rm is Reject share by mass (ratio of fibres) and Rv is Reject share by volume (ratio of the flow) taken out at the heavy fraction outlet.

In order to minimize the Thickening factor of a hydrocyclone, means for creating turbulence may be provided in the separation chamber. Such examples are described in, for example, EP 615469 B1. Such means for creating turbulence may be a step where the radius of the inside wall of the separation chamber suddenly increases, which causes a turbulent flow expanding flocks of fibres and releasing undesired particles from the fibre network often forming close to the wall of the separation chamber. The steps are parallel with the centre axis of the hydrocyclone.

But there is a need of balancing so that the creating of a turbulent flow expanding fibre flocks will not disturb the helical vortex separating the undesired particles so that the separation efficiency of the hydrocyclone will not be diminished.

Another known hydrocyclone having means for creating turbulence is Celleco Cleanpac 130 made and sold by GL&V Sweden AB. It has a helical path in the circumferential wall of the separation chamber, along a portion of the separation chamber, in the same direction as a helical vortex of the liquid stream when in use. The means for creating turbulence is the same as in EP 615469 B1, i.e. the helical path shows a sudden increase in radius of the separation chamber, one per revolution of the helical path and parallel with the centre axis.

SUMMARY OF THE INVENTION

The present invention is a further improvement of the technology of EP 615469 B1. This is obtained by a hydrocyclone of the type described initially, wherein the at least one step having an angle relative the centre axis.

By providing at least one step increasing the radius of the separation chamber in angle relative the centre axis, a secondary vortex is formed due to a pressure drop occurring after the step/-s having a component of flow radially outwards and a component of flow towards the apex transporting the relatively heavier particles at the circumferential wall of the separation chamber radially outwards and towards the heavy fraction outlet at the apex end. Thus, any component of flow directed radially inwards, which could disturb the helical vortex of the liquid stream and thus disturb the separation of undesired particles, is minimized.

The rotational axis of the secondary vortex has about the same angle to the centre axis as the step or an increased angle. This is due to the fact that mainly the secondary vortex will be in line with the inclined step but a portion of the helical vortex travelling along the circumferential wall will reach the inclined step with a small delay along the step, since the helical vortex will first reach the step at a first end closest to the base end of the hydrocyclone and then subsequently along the step towards a second end of the step closest to the apex end.

According to one embodiment, when more than one step is arranged in the path of the circumferential wall, a passage is formed between two subsequent steps towards the apex end. The passage will have about the same radius. This passage will alleviate for undesired particles flowing along the path to flow towards the apex end through the passage to the subsequent level of path in the circumferential wall. The secondary vortex after the passage will further alleviate the flow of undesired particles to the subsequent level of path.

In another embodiment, the first and the second end of the step is rounded so that a smooth connection between the subsequent paths before and after the step is provided.

The path in the circumferential wall may have a lot of different shapes and constellations. For example the path may only cover a portion of the circumferential wall seen along the centre axis. But the path may also, or instead, only cover a portion of the circumference, for example half of the circumference. In one preferred embodiment the path has a helical shape. In another preferred embodiment the path is helical but asymmetric so that one side of the circumferential wall is smooth and the opposite side has an increased path depth compared to a symmetric helical path. In a further preferred embodiment the path is in the form of asymmetrically arranged cylinders, decreasing in radius towards the apex end; where one side of the circumferential wall is smooth and the opposite side has increased path depth compared to symmetrically arranged cylinders.

According to a further embodiment of the present invention, each revolution of the helical path of the circumferential wall comprises a step. The angle of the step relative the centre axis may be between 2 and 70 degrees, preferably between 5 and 45 degrees.

Although the two known hydrocyclones described above do lower the Thickening factor a hydrocyclone of the present invention will also increase the reject reduction efficiency. Thus it will be possible to take out a smaller amount of separated heavy fraction (this will work due to the lower Thickening factor) and still reduce the undesired particles at the same or even better level. Therefore less light fraction (for example containing fibres) will be lost. Tests have shown that this will give the best effects on hydrocyclones with large inlets, which will also give a smaller pressure drop over the hydrocyclone and thus save energy.

SHORT DESCRIPTION OF THE DRAWINGS

Figure 1:
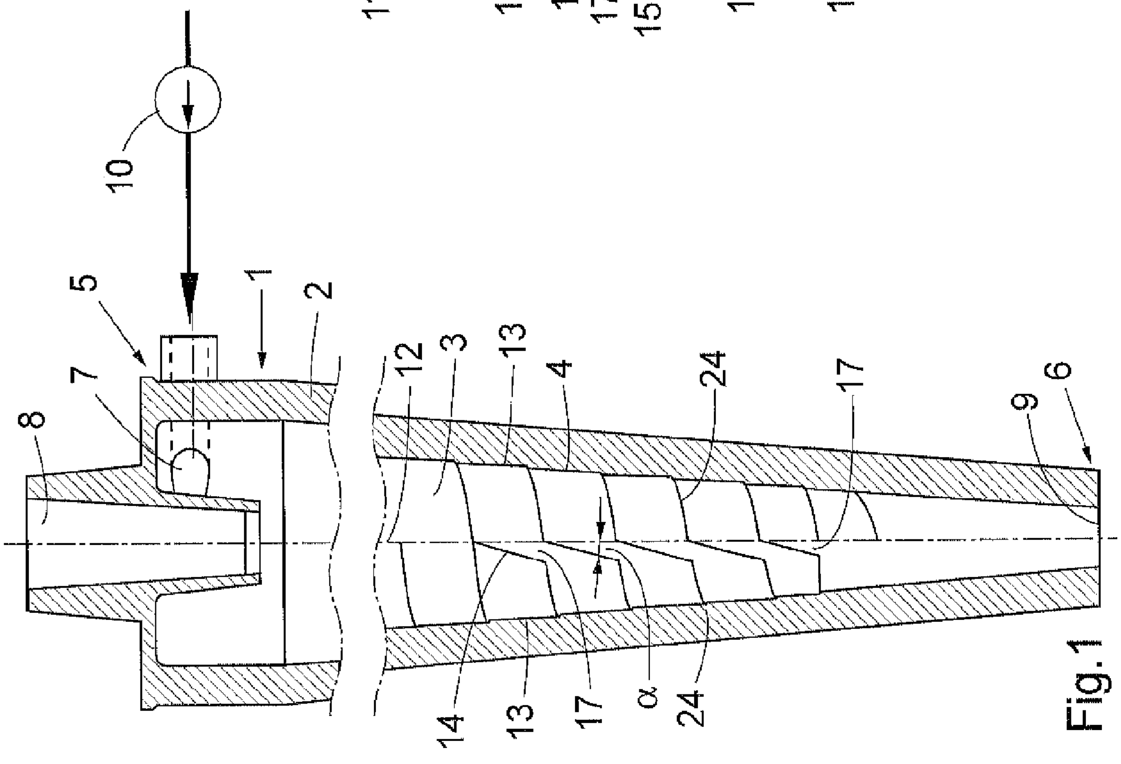
Figure 4:
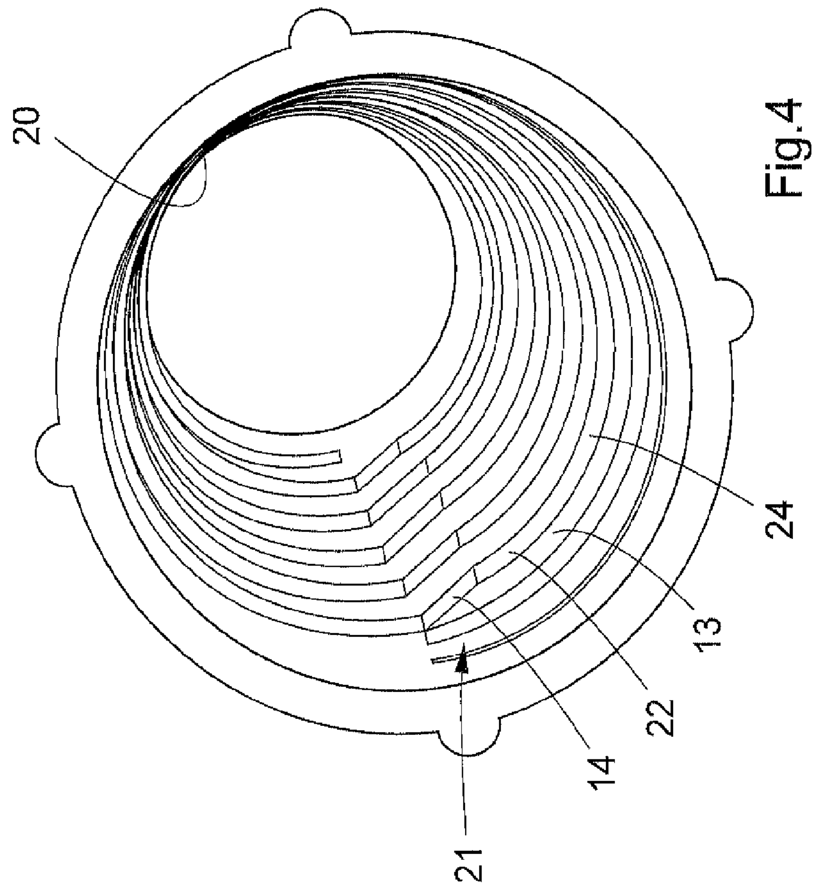
Figure 3:
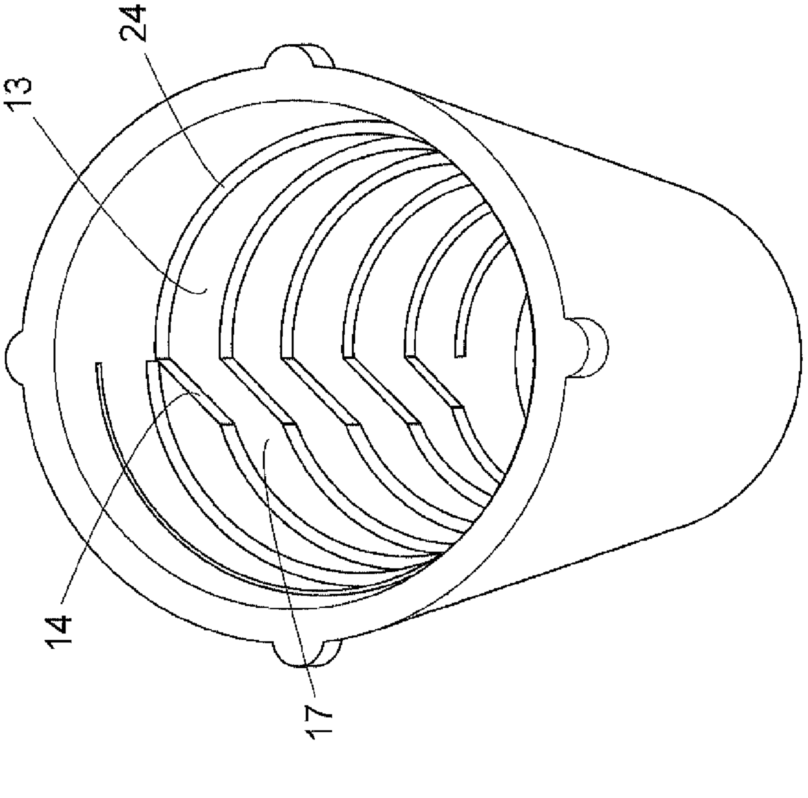
Figure 5:
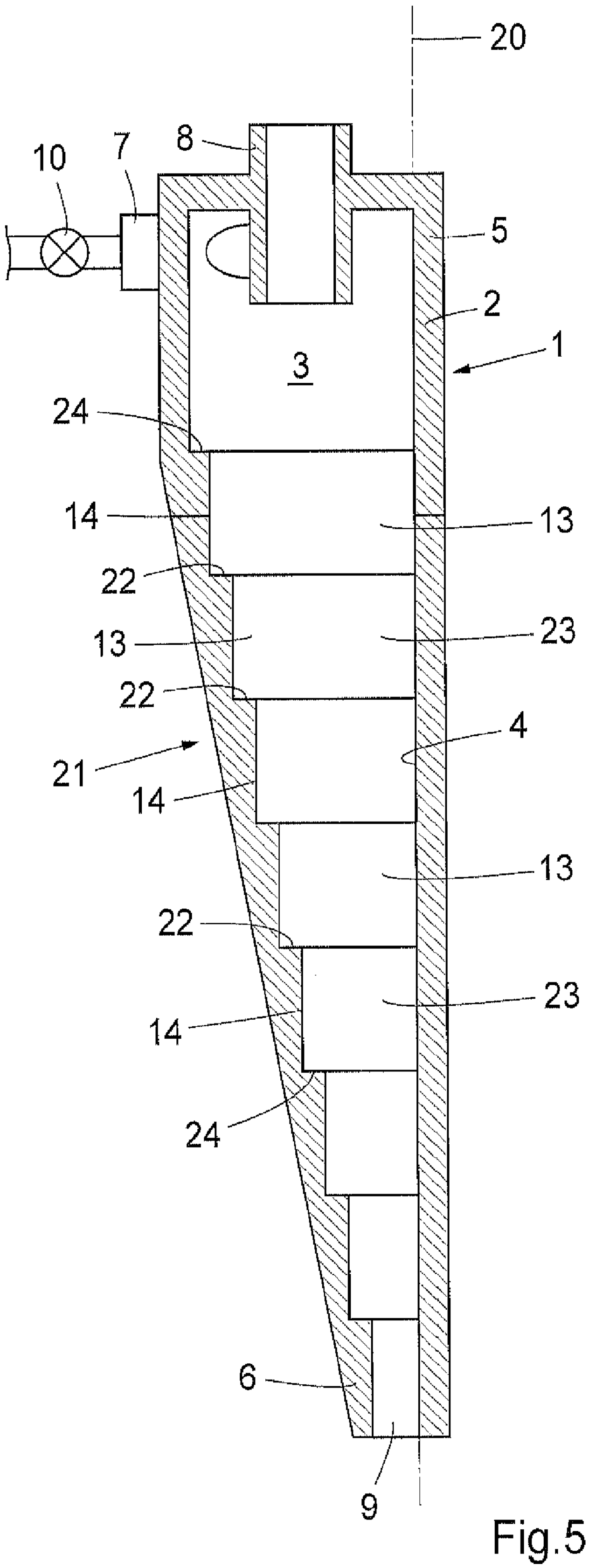

The present invention will now be described in more detail under referral to the accompanying drawings, in which:

FIG. 1 shows a sectional view of a hydrocyclone according to an embodiment of the present invention, FIG. 2 shows functional features in an embodiment of the invention, FIG. 3 shows a helical path inside a hydrocyclone according to an embodiment of the present invention, FIG. 4 shows an asymmetric helical path inside a hydrocyclone according to another embodiment of the present invention, and FIG. 5 shows a path inside a hydrocyclone made up by asymmetrically arranged cylinders according to a further embodiment of the present invention.

DETAILED DESCRIPTION OF PREFERRED EMBODIMENTS OF THE PRESENT INVENTION

FIG. 1 shows a hydrocyclone 1 for separating a liquid mixture into a heavy fraction and a light fraction in a sectional view along a centre axis 12. The hydrocyclone 1 comprises a housing 2 forming an elongated separation chamber 3 having a circumferential wall 4. The hydrocyclone 1 has a base end 5 wherein an inlet member 7 is arranged via which a liquid mixture to be separated will be supplied preferably tangentially into the separation chamber 3 by means 10 for this purpose, such as a pump, in order to generate a liquid stream in the form of a helical vortex 11 about the centre axis 12. If desired, several inlet members may be arranged, for example one arranged at about the middle of the length of the hydrocyclone 1 (not shown).

The hydrocyclone 1 comprises an apex end 6 opposite the base end 5. At least two different outlet members are arranged. In an embodiment of the present invention, see FIG. 1, a first outlet member 8 is arranged for discharging the separated light fraction from the separation chamber 3 at the base end 5 and a second outlet member 9 is arranged for discharging the separated heavy fraction from the separation chamber 3 at the apex end 6. The helical vortex 11 extends from the base end 5 to the apex end 6.

A hydrocyclone 1 according to the present invention is provided with at least one path 13 in the circumferential wall 4 of the separation chamber 3. The path 13 in the circumferential wall 4 may have a lot of different shapes and constellations. For example the path 13 may only cover a portion of the circumferential wall 4 seen along the centre axis, see for example FIG. 1. But the path 13 may also, or instead, only cover a portion of the circumference, see for example FIG. 4 and 5 or for example half of the circumference.

In the inventive hydrocyclone 1 there is at least a turbulence creating means, which comprises at least one step 14 in this path 13 of the circumferential wall 4; showing an increase of the radius of the separation chamber 3. The at least one step is arranged in an angle $\alpha$ relative a plane extending through the centre axis 12. The angle is a positive angle seen in the direction towards the apex end 6. Preferably the angle $\alpha$ is between 2-70 degrees, and most preferred between 5-45 degrees. Preferably each revolution of the path 13 in the circumferential wall 4 comprises a step 14. It is also conceivable to arrange more than one step 14 per revolution.

When the helical vortex 11 flow along the circumferential wall 4 of the separation chamber 3 it will reach the inclined step 14 and a secondary vortex 15 is formed due to a pressure drop occurring after the step 14, see FIG. 2. The secondary vortex 15 has a component of flow radially outwards and a component of flow towards the apex end 6 transporting the relatively heavier particles 25 at the circumferential wall 4 of the separation chamber 3 radially outwards and towards the heavy fraction outlet 9 at the apex end 6.

The heavy reject particles 25, which have been transported by means of the secondary vortex 15, will land on a shelf 24 and the helical vortex 11 will carry on transporting the heavy reject particles 25 until they reach a passage 17 in the vicinity of the subsequent step 14 towards the apex end 6, when the circumferential wall 4 is provided with more than one path 13. The secondary vortex 15 of the subsequent step 14 will further transport the heavy reject particles 25. The passage 17 will preferably have about the same radius. In the shown embodiments the passages 17 and the steps 14 are situated at about the same rotational angle about the centre axis 12 for each revolution of the path 13 but it is of course conceivable to arrange the steps 14 with more or less than 360 degrees to the subsequent step 14 in the path 13, whereby the shape of the passage 17 will differ correspondingly.

A rotational axis 16 of the secondary vortex 15 has about the same angle to the centre axis 12 as the step 14 or an increased angle. This is due to the fact that mainly the secondary vortex 15 will be in line with the inclined step 14 but a portion of the helical vortex 11 travelling along the circumferential wall 4 will reach the inclined step 15 with a small delay along the step 14, since the helical vortex 11 will first reach the step 14 at a first end 18 closest to the base end 5 of the hydrocyclone 1 and then subsequently along the step 14 towards a second end 19 of the step 14 closest to the apex end 6.

In the embodiment of FIG. 2, the first 18 and the second 19 end of the step 14 is rounded so that a smooth connection between the subsequent paths 13 and especially the shelf 24 before and after the step 14 is provided. As an example, the depth of the shelf 24 is about 1-5 mm at least at the deepest position, preferably 1,5-3 mm.

In one preferred embodiment the path 13 has a helical shape, see FIG. 1, 2 and 3. In FIG. 4 another preferred embodiment of the path 13 is shown. The path 13 is helical but asymmetric so that one side 20 of the circumferential wall 4 is smooth and the opposite side 21 has an increased path depth 22 compared to a symmetric helical path 13. In a further preferred embodiment, see FIG. 5, the path 13 is in the form of asymmetrically arranged cylinders 23, decreasing in radius towards the apex end 6, where one side 20 of the circumferential wall 4 is smooth and the opposite side 21 has increased path depth 22 compared to symmetrically arranged cylinders 23.

In an embodiment with one or more paths 13 that do not cover the full revolution, for example the asymmetric embodiment above shown in FIGS. 4 and 5, the shelf 24 will diminish from the step 14 towards the smooth side 20, whereby the heavy reject particles 25 may be easily transported towards the apex end 6 at the smooth side 20 and at any passages 17.

The invention claimed is:

1. A hydrocyclone for separating a liquid mixture into a heavy fraction and a light fraction, comprising: a housing forming an elongated separation chamber having a circumferential wall, a base end, an apex end, at least one inlet member for supplying a liquid mixture into the separation chamber, at least one of the inlet members positioned at the base end, a first outlet member for discharging separated light fraction from the separation chamber at the base end, a second outlet member for discharging separated heavy fraction from the separation chamber at the apex end, means for supplying the liquid mixture to the separation chamber via the at least one inlet member, so that during operation a liquid stream is generated as a helical vortex about a centre axis in the separation chamber, said helical vortex extending from the base end to the apex end, at least one path in the circumferential wall at least over a portion of the separation chamber, and at least one means for creating turbulence, which comprises at least one step in the path of the circumferential wall showing an increase of the radius of the separation chamber, wherein the at least one step has an angle (α) relative the centre axis.

2. A hydrocyclone according to claim 1, wherein the at least one step induces a pressure drop and a secondary vortex having a rotational axis, the angle relative the centre axis being about the same as the angle (α) for the step or increased.

3. A hydrocyclone according to claim 1, wherein a passage is formed having about the same radius between two subsequent steps towards the apex end.

4. A hydrocyclone according to claim 1, wherein a first and a second end of the step is rounded to smoothly connect to the subsequent paths in the circumferential wall.

5. A hydrocyclone according to claim 1, wherein the path of the circumferential wall has a helical shape.

6. A hydrocyclone according to claim 5, wherein the helical path is asymmetric so that one side of the circumferential wall is smooth and the opposite side has increased path depth compared to a symmetric helical path.

7. A hydrocyclone according to claim 1, wherein the path of the circumferential wall is in the form of asymmetrically arranged cylinders, decreasing in radius towards the apex end, where one side of the circumferential wall is smooth and the opposite side has increased path depth compared to symmetrically arranged cylinders.

8. A hydrocyclone according to claim 1, wherein each revolution of the path of the circumferential wall comprises a step.

9. A hydrocyclone according to claim 1, wherein the angle (α) of the step relative the centre axis is between 2 and 70 degrees.

10. A hydrocyclone according to claim 9, wherein the angle (α) of the step relative the centre axis is between 5 and 45 degrees.

* * * * *